UNITED STATES PATENT OFFICE.

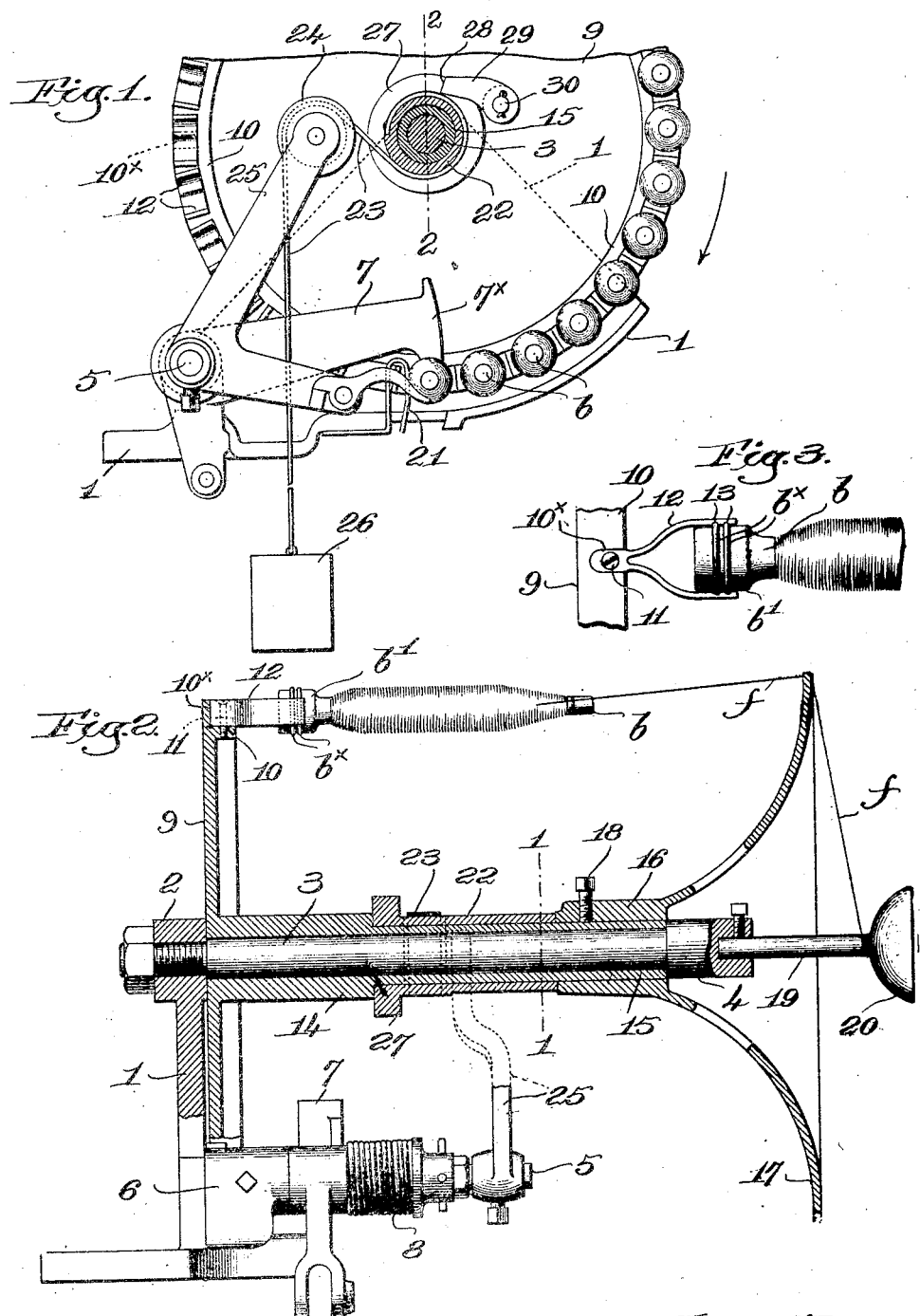

GEORGE O. DRAPER, OF HOPEDALE, MASSACHUSETTS, ASSIGNOR TO DRAPER COMPANY, OF HOPEDALE, MASSACHUSETTS, A CORPORATION OF MAINE.

FILLING-REPLENISHING MECHANISM FOR LOOMS.

No. 887,927.

Specification of Letters Patent.

Patented May 19, 1908.

Application filed October 28, 1907. Serial No. 399,437.

*To all whom it may concern:*

Be it known that I, GEORGE O. DRAPER, a citizen of the United States, and resident of Hopedale, county of Worcester, State of Massachusetts, have invented an Improvement in Filling-Replenishing Mechanism for Looms, of which the following description, in connection with the accompanying drawing, is a specification, like characters on the drawing representing like parts.

This invention relates more particularly to automatic looms wherein the running shuttle is automatically provided with fresh filling when necessary by the insertion therein of a filling-carrier or bobbin, as for instance in United States Patent No. 529940 granted to Northrop November 27, 1894.

My present invention has for its object the production of novel mechanism for effecting such replenishment of filling, and has especial reference to the hopper or feeder which sustains the reserve supply of filling-carriers.

The various novel features of my invention will be fully described in the subjoined specification and particularly pointed out in the following claims.

Figure 1 is a transverse section, on the line 1—1, Fig. 2, looking toward the left, of filling replenishing mechanism embodying my invention; Fig. 2 is mainly a longitudinal sectional view of the replenishing mechanism, on the line 2—2, Fig. 1, the transferring device and some of the adjacent parts being in front elevation; Fig. 3 is an enlarged top plan view of one of the spring-jaws for grasping and properly supporting a filling-carrier.

Referring to Figs. 1 and 2 a rigid, upright stand 1, in practice mounted on the breast-beam of a loom at one side thereof, has a boss 2, Fig. 2, in which is fixedly held an outwardly extended horizontal shaft 3, the outer end of the shaft being enlarged to form a head 4.

A stud 5 is mounted in a part 6 of the stand, and on this stud is fulcrumed the transferrer 7, retracted by a spring 8 and operated in well known manner to transfer a filling-carrier from the feeder to the shuttle, as for instance in said Northrop patent.

Upon the shaft 3 adjacent the outer face of the stand 1 I rotatably mount the filling-feeder, it consisting of a circular plate 9 having its peripheral portion thickened at 10 and provided on its outer, circular face with a series of seats or pockets $10^x$, in which are inserted and secured by fastening means, as 11, the shanks of spring or separable jaws 12, arranged in a circle around the plate or feeder 9 and extended horizontally therefrom parallel to its axis.

The inner faces of the jaws are provided with notches 13, Fig. 3, to receive the rings $b^x$ on the butts $b'$ of the filling-carriers $b$, whereby a series of the latter are sustained by the feeder in a circle and parallel to the shaft 3, said filling-carriers being supported at their butts only, as will be manifest, leaving their tips free and unsupported.

The insertion of a filling-carrier into one of the spring-jaws is easily effected by the attendant, and when a filling-carrier is in position to be transferred its grasping jaws are in vertical planes and permit the head $7^x$ of the transferrer 7 to engage the butt and force it out and downward from the jaws to the shuttle.

The feeder 9 has an elongated hub 14 reduced in diameter at 15 and extended outward to the head 4 of the shaft 3, the latter and the stand 1 preventing lengthwise movement of the hub on the shaft.

Upon the outer end of the hub extension 15 is mounted the hub 16 of a bell-like circular disk 17, Fig. 2, held fast on the extension by a set screw 18, the disk rotating with the feeder and being located beyond the tips of the filling-carriers, while in the outer end of the shaft 3 I fixedly mount the filling-end holder, shown as a shank 19 having a head 20.

The filling-end $f$, Fig. 2, is led from the tip of each filling-carrier across the edge of the disk 17 and then down to the holder, being wound around the shank 19 thereof a number of times to fasten it.

As the feeder and disk rotate in the direction of the arrow, Fig. 1, the filling-ends are wound in the opposite direction onto the end holder, so that as the feeder rotates said filling-ends will be wound upon the holder, and thereby kept properly taut.

The disk 17 is far enough away from the tips of the carriers to afford a sufficient length of filling to prevent breakage when a carrier is transferred to the shuttle by the transferrer 7.

Referring to Fig. 1 the stand 1 is provided with a stop or abutment 21, preferably made of rather stiff spring metal, substantially as in United States Patent No. 834945 granted to Stimpson November 6, 1906.

The leading filling-carrier of the series sustained by the feeder rests against the abutment in position to be transferred, and I have provided novel and continuously acting means to effect rotative movement of the feeder.

A barrel 22 is rotatably mounted on the extension 15 between the disk hub 16 and the part 14 of the feeder hub, and has attached to it one end of a flexible strap or other connection 23, which is adapted to be wound about the barrel and is then led over a guide-sheave 24, Fig. 1, rotatably mounted on an upturned arm 25 fixedly mounted on the outer end of the stud 5. The free end of the connection 23 is secured to an actuating weight 26, which tends to continuously unwind the connection from the barrel 22, to rotate it. Said barrel has an enlarged head 27 provided with a notch 28, Fig. 1, to receive a pawl 29 mounted on a stud 30 on and projecting outward from the feeder 9, so that rotation of the barrel will rotate the feeder.

The weight 26 acts to hold the leading filling-carrier against the abutment 21, and after transfer thereof to the shuttle the transferrer 7 returns to normal position and the weight operates to advance or turn the feeder to bring the next filling-carrier into transferring position.

The weight by its continuous action upon or control over the feeder prevents any accidental retrograde movement thereof and holds it steady when the loom is running normally, and effects the feed or advance movement of the feeder steadily and quickly at the proper time, without any shock or jar.

When the connection 23 has been unwound from the barrel 22 the latter may be turned by the attendant oppositely to the arrow in Fig. 1, to rewind the connection thereby raising the actuator 26, the weight of which is transmitted to the feeder 9 by the means described.

By the horizontal arrangement of the spring-jaws for the butts of the filling-carriers the latter are firmly and securely held in position, they are readily inserted in the jaws, and they are held in convenient and exact position to be transferred to the shuttle.

My invention may be varied in detail by those skilled in the art without departing from the spirit and scope of my invention as set forth in the appended claims.

Having fully described my invention what I claim as new and desire to secure by Letters Patent is:—

1. The combination, with a rotatable feeder and means thereon to support at one end only a plurality of filling-carriers of a stationary holder for the filling-ends led therefrom.

2. The combination, with a rotatable feeder having means to support a plurality of filling-carriers, of a stationary holder for the filling-ends, located co-axially with the feeder.

3. The combination, with a rotatable feeder having means to support a plurality of filling-carriers, of a stationary holder for the filling-ends, located co-axially with the feeder, and a circular support for the filling-ends, intermediate said holder and the feeder and rotatable with the latter.

4. A rotatable filling-feeder, combined with a circularly-arranged series of spring-jaws mounted thereon in parallelism with its axis and each adapted to grasp one end only of a filling-carrier, and a stationary holder for the filling-ends, led from the tips of the filling-carriers.

5. A circular, rotatable filling-feeder, combined with a series of pairs of separable jaws fixedly mounted upon its periphery and extended in parallelism with its axis, to engage and support by their butts only a plurality of filling-carriers, and a stationary holder for the filling-ends, located co-axially with the feeder and beyond the tips of the filling-carriers.

6. A rotatable filling-feeder, provided with a circularly-arranged series of spring-clips thereon each adapted to engage one end only of a filling-carrier, a circular disk connected with the feeder beyond the tips of the filling-carriers, a fixed shaft on which the feeder and disk rotate in unison, and a filling-end holder mounted on the outer end of the shaft beyond the disk, the latter supporting the filling-ends between said holder and the tips of the filling-carriers.

7. A rotatable filling-feeder having means to support by their butts only a circularly-arranged series of filling-carriers, and a stationary filling-end holder for the feeder.

8. In a loom, a rotatable feeder to sustain a circularly-arranged series of filling-carriers, means to transfer the latter one by one from the feeder, and means acting continuously and uniformly upon the feeder to rotate it and bring one after another of the filling-carriers into position to be transferred.

9. In a loom, a fixedly-supported horizontal shaft, a circular feeder rotatably mounted thereon, having an elongated hub and means to sustain a circularly-arranged series of filling-carriers, a filling-end holder mounted on the outer end of the shaft, a disk connected with said hub, to rotate with the feeder and support the filling-ends between the holder and the tips of the filling-carriers, a barrel on the hub and operatively connected with the feeder, an actuating weight, and a flexible connection between it and the barrel and wound around the latter, to effect rotation of the feeder.

10. In a loom, in combination, a rotatable feeder to sustain a circularly-arranged series of filling-carriers, means to transfer the latter one by one from the feeder, and a weighted actuator constantly acting upon the feeder.

11. In a loom, in combination, a rotatable feeder to sustain a circularly-arranged series of filling-carriers, means to transfer the latter one by one from the feeder, an abutment against which the leading filling-carrier rests, and continuously-operative mechanism to rotate the feeder after transfer of a filling-carrier.

In testimony whereof, I have signed my name to this specification, in the presence of two subscribing witnesses.

GEORGE O. DRAPER.

Witnesses:
  E. D. BANCROFT,
  ERNEST W. WOOD